(12) United States Patent
Smith

(10) Patent No.: US 6,464,885 B1
(45) Date of Patent: Oct. 15, 2002

(54) WATER TREATMENT SYSTEMS

(76) Inventor: Tony L. Smith, 9353 Harrison Rd., Sedro Woolley, WA (US) 98284

( * ) Notice: Subject to any disclaimer, the term of this patent is extended or adjusted under 35 U.S.C. 154(b) by 0 days.

(21) Appl. No.: 09/912,614

(22) Filed: Jul. 24, 2001

Related U.S. Application Data

(63) Continuation-in-part of application No. 09/470,577, filed on Dec. 22, 1999, now Pat. No. 6,264,846.

(51) Int. Cl.[7] .................................................. C02F 1/00
(52) U.S. Cl. ..................... 210/749; 210/198.1; 210/199; 210/205
(58) Field of Search .............................. 210/749, 198.1, 210/199, 205

(56) References Cited

U.S. PATENT DOCUMENTS

| | | | | |
|---|---|---|---|---|
| 4,292,051 A | * | 9/1981 | Kime | |
| 4,339,332 A | * | 7/1982 | Jasperson | |
| 4,640,782 A | * | 2/1987 | Burleson | |
| 5,350,512 A | * | 9/1994 | Tang | |
| 5,447,641 A | * | 9/1995 | Wittig | |
| 5,746,923 A | * | 5/1998 | Forward | |
| 6,096,221 A | * | 8/2000 | Kerchouche et al. | |
| 6,129,850 A | * | 10/2000 | Martin et al. | |
| 6,294,096 B1 | * | 9/2001 | Michael | |

* cited by examiner

*Primary Examiner*—Betsey Morrison Hoey
(74) *Attorney, Agent, or Firm*—Michael R. Schacht; Schacht Law Office In

(57) ABSTRACT

A system for processing water by adding an additive to a stream of pressurized fluid. The system comprises first and second bodies. The first body defines a main passageway having a main inlet and a main outlet. The stream of pressurized fluid enters the main passageway through the main inlet. The second body is secured to the first body. The second body defines an additive passageway having an additive port. The additive passageway is in fluid communication with the main passageway at an injection location. Fluid flowing through the system creates low pressure that draws the additive through the additive port and the additive passageway and into the stream of pressurized fluid.

33 Claims, 12 Drawing Sheets

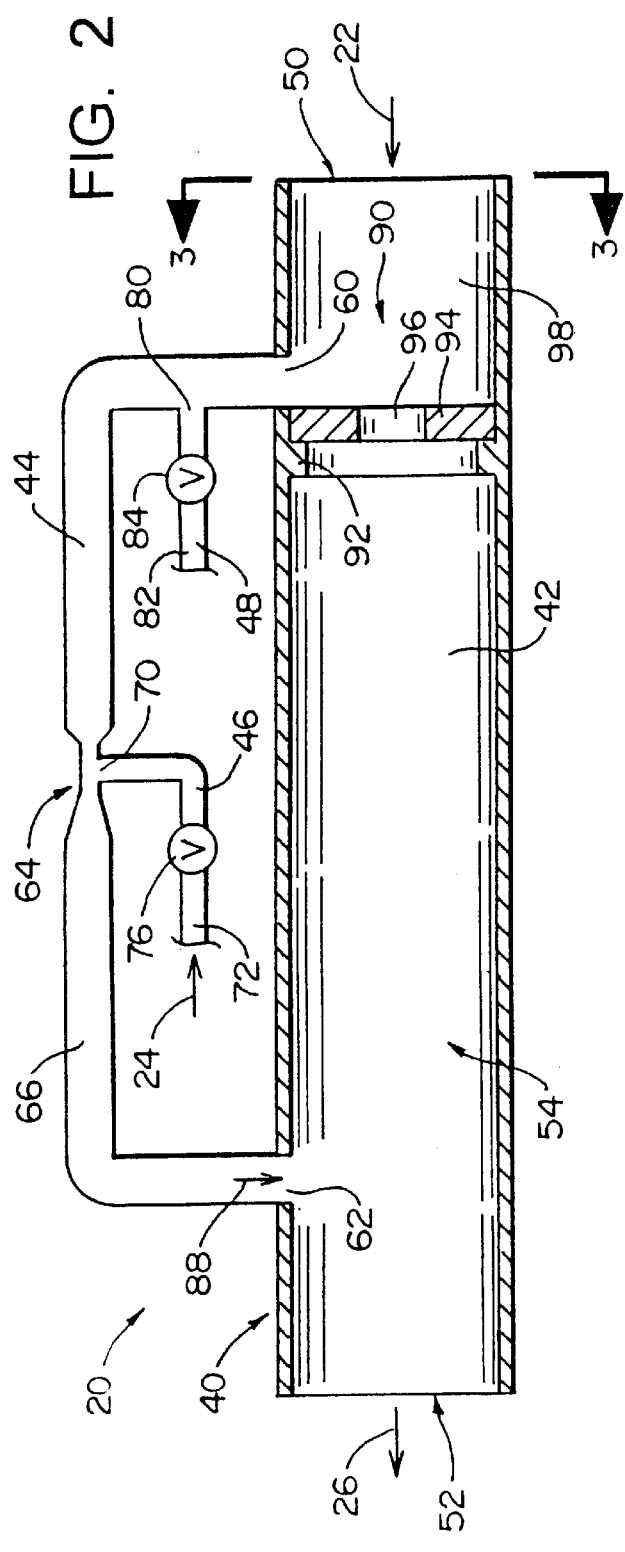
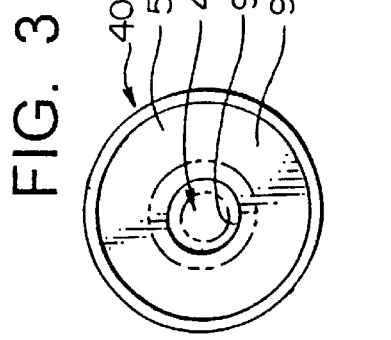
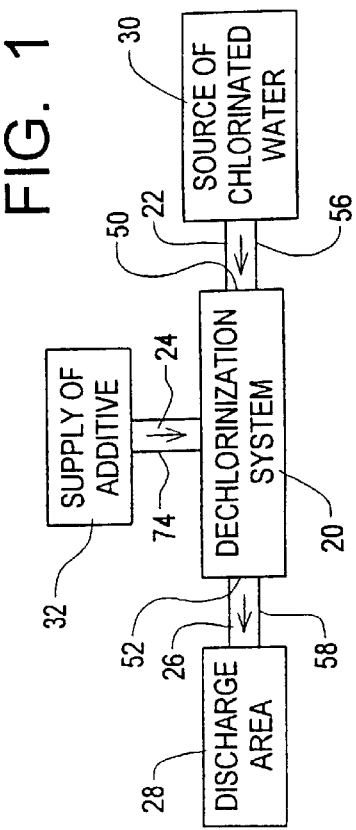

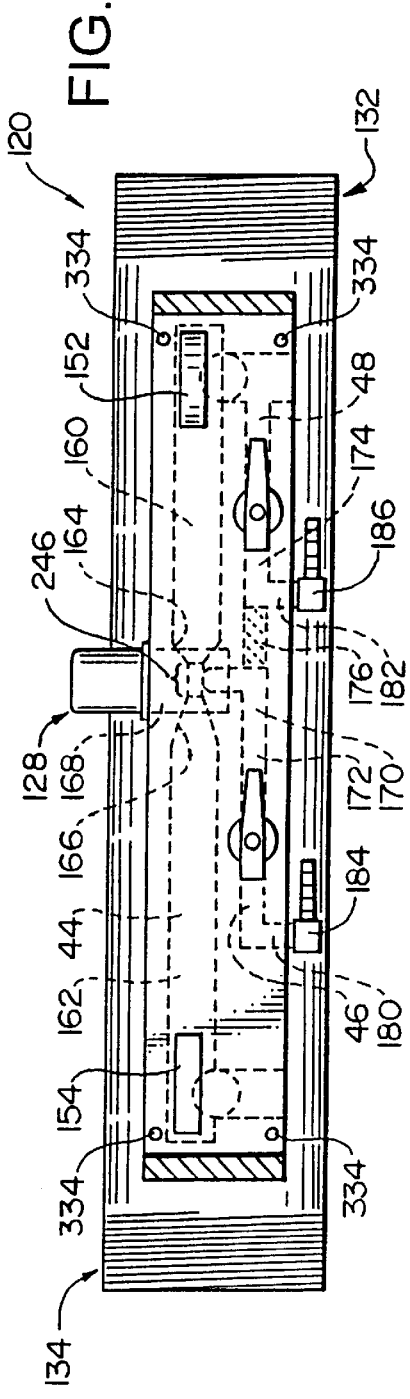
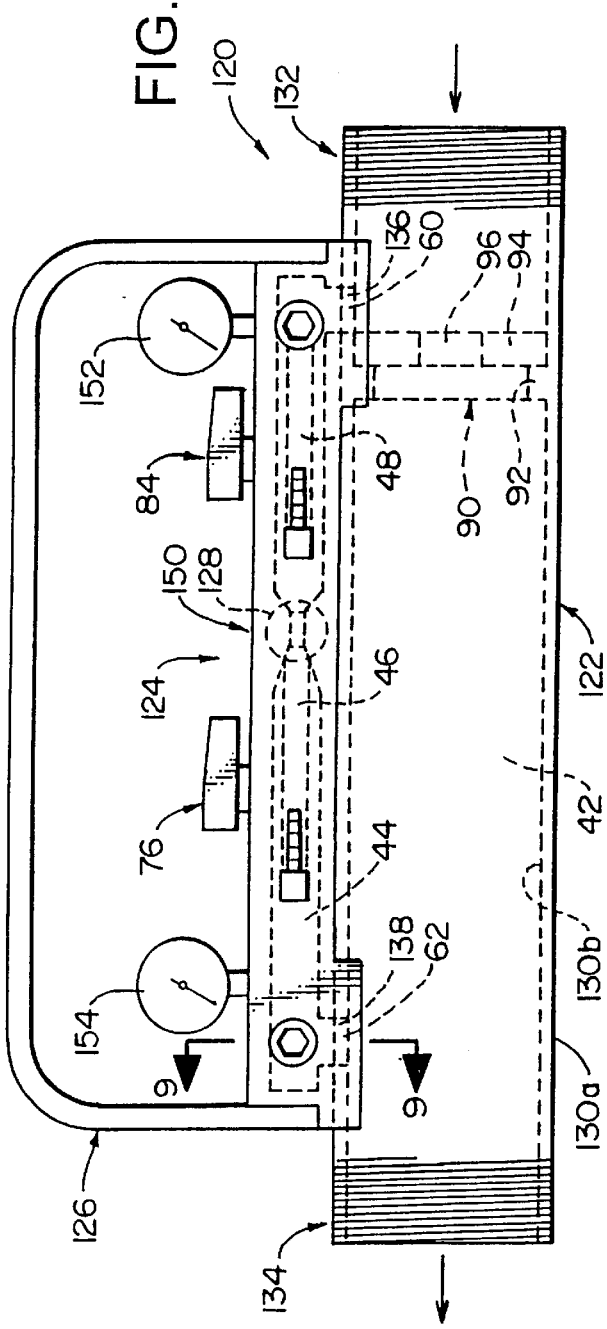

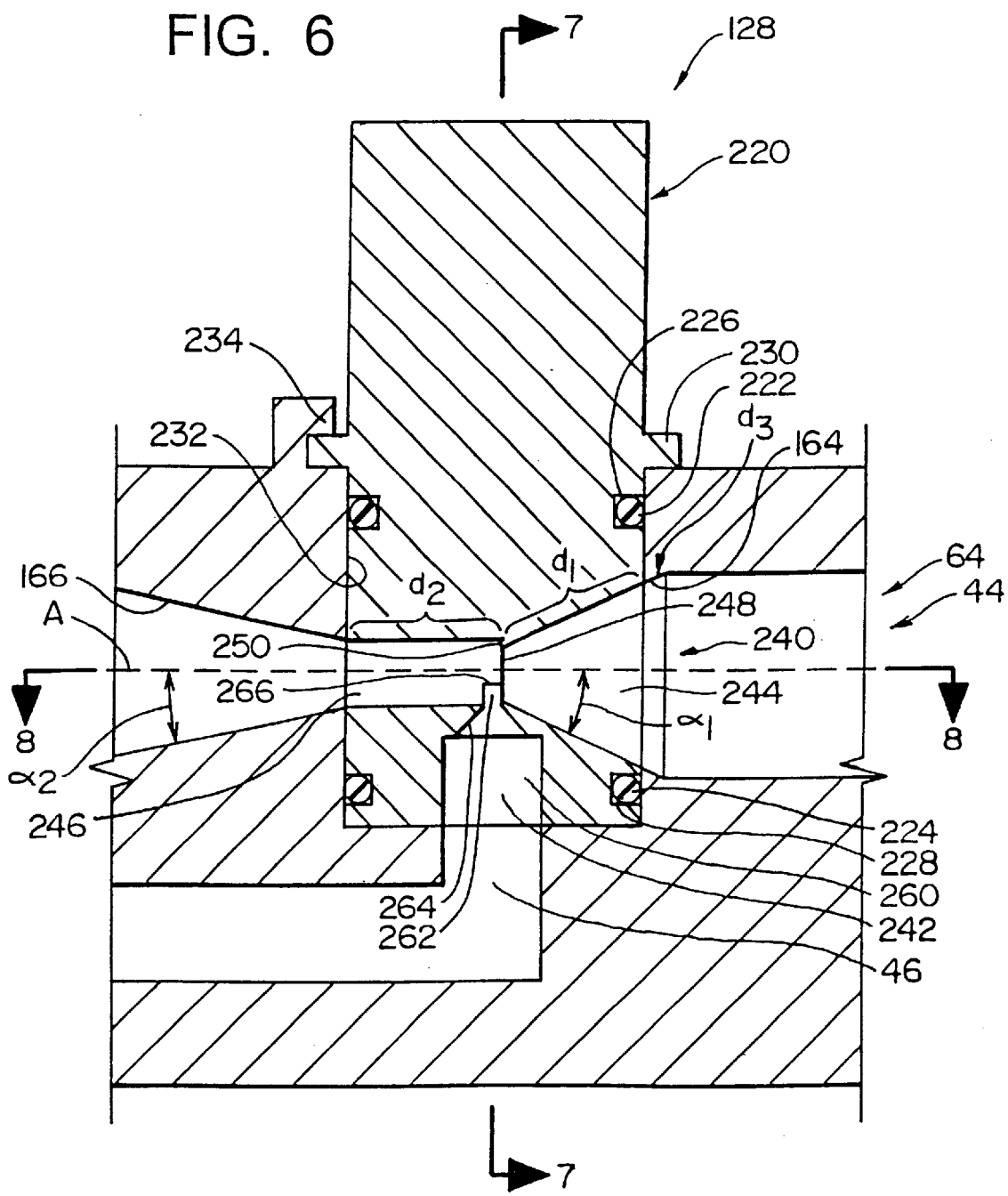

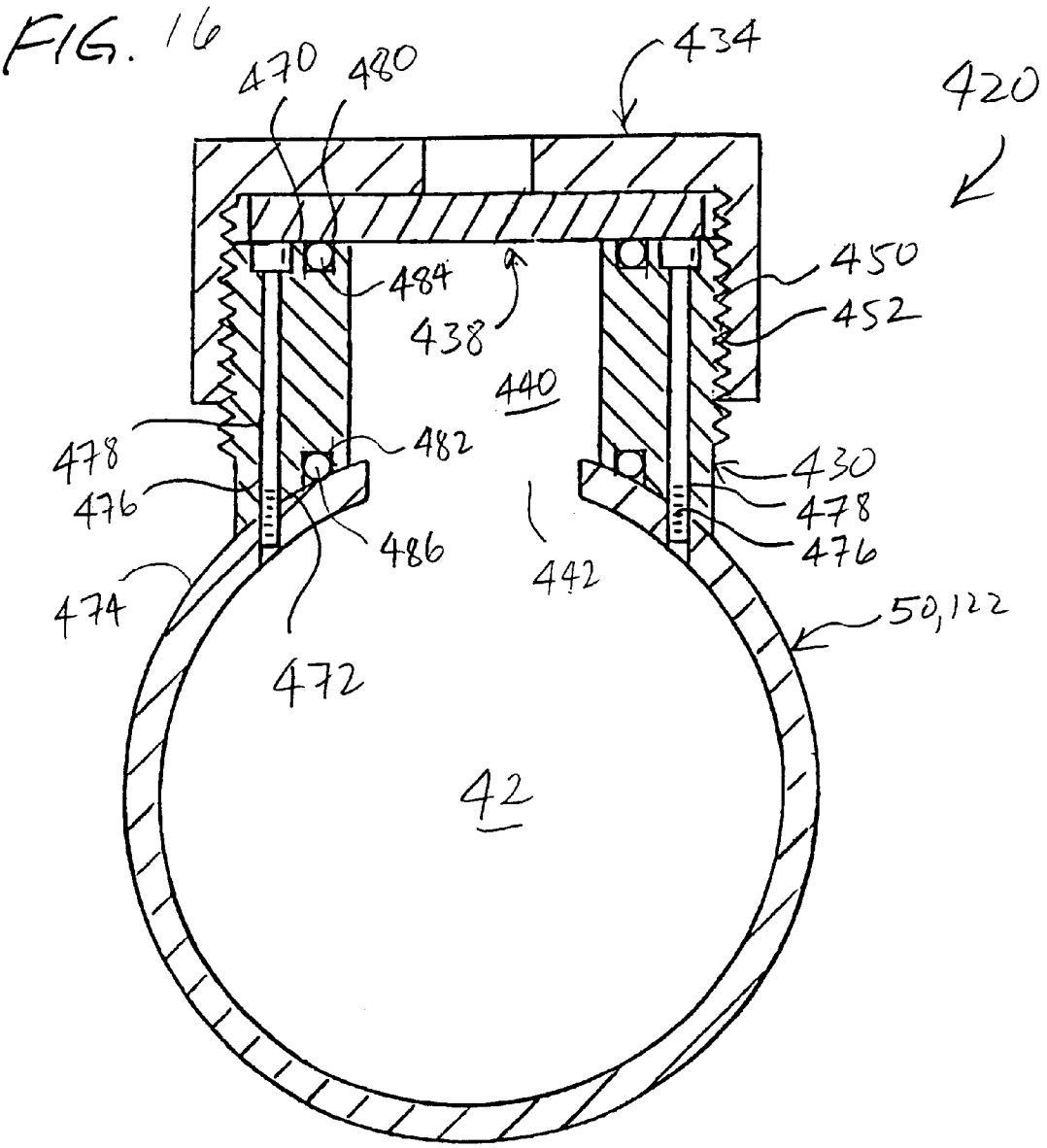

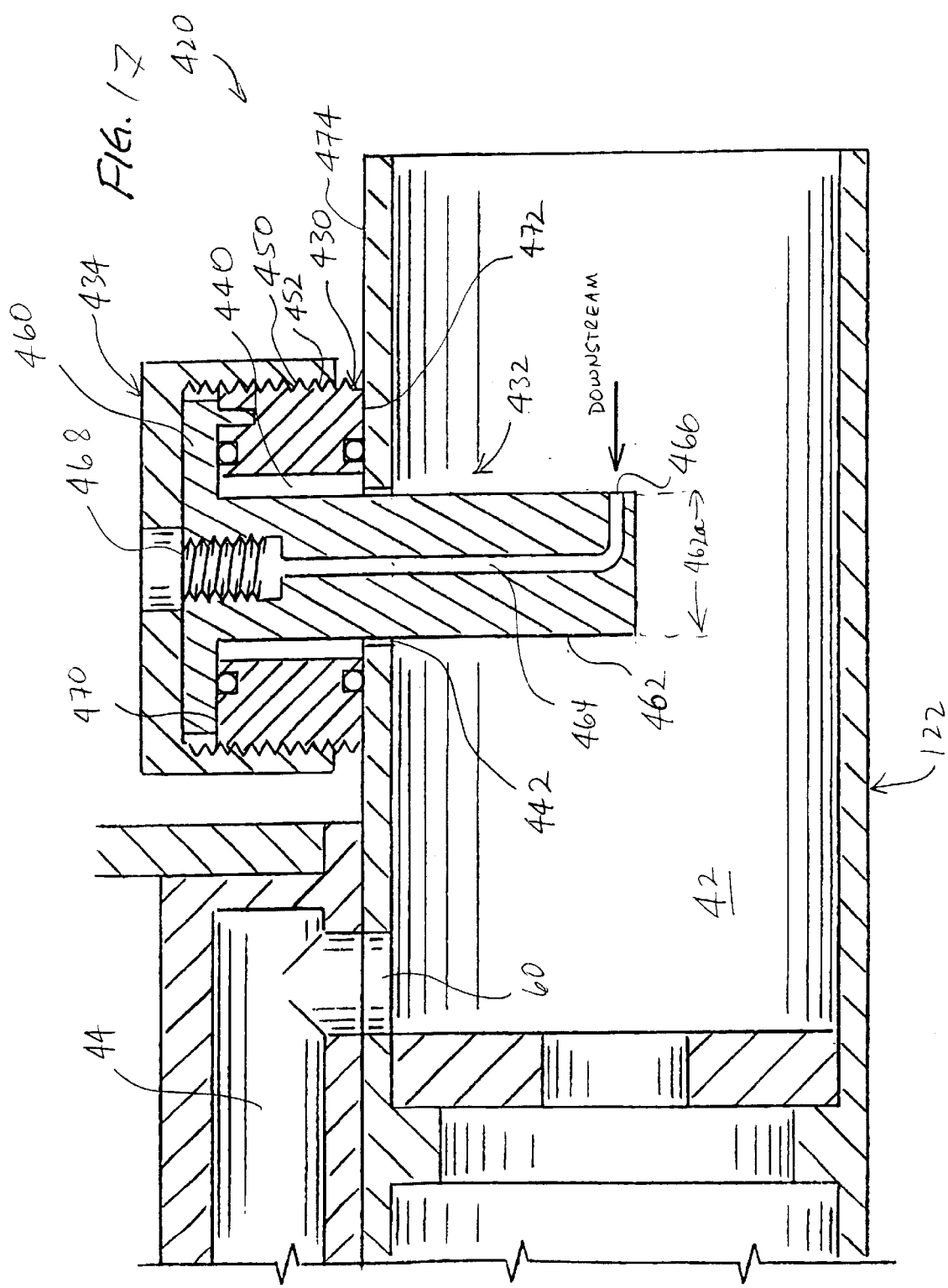

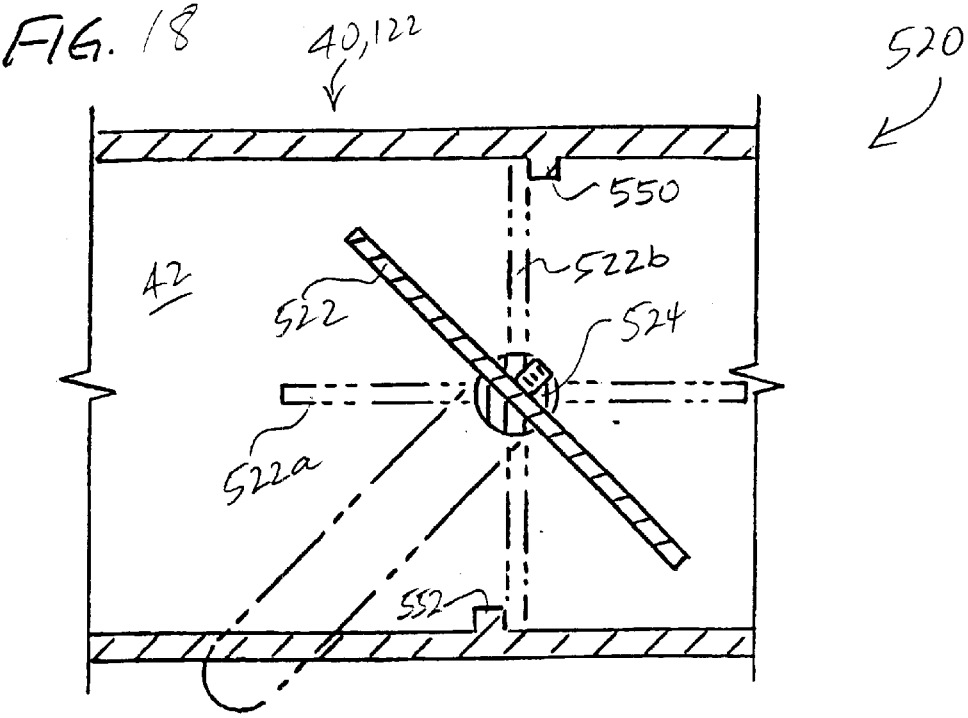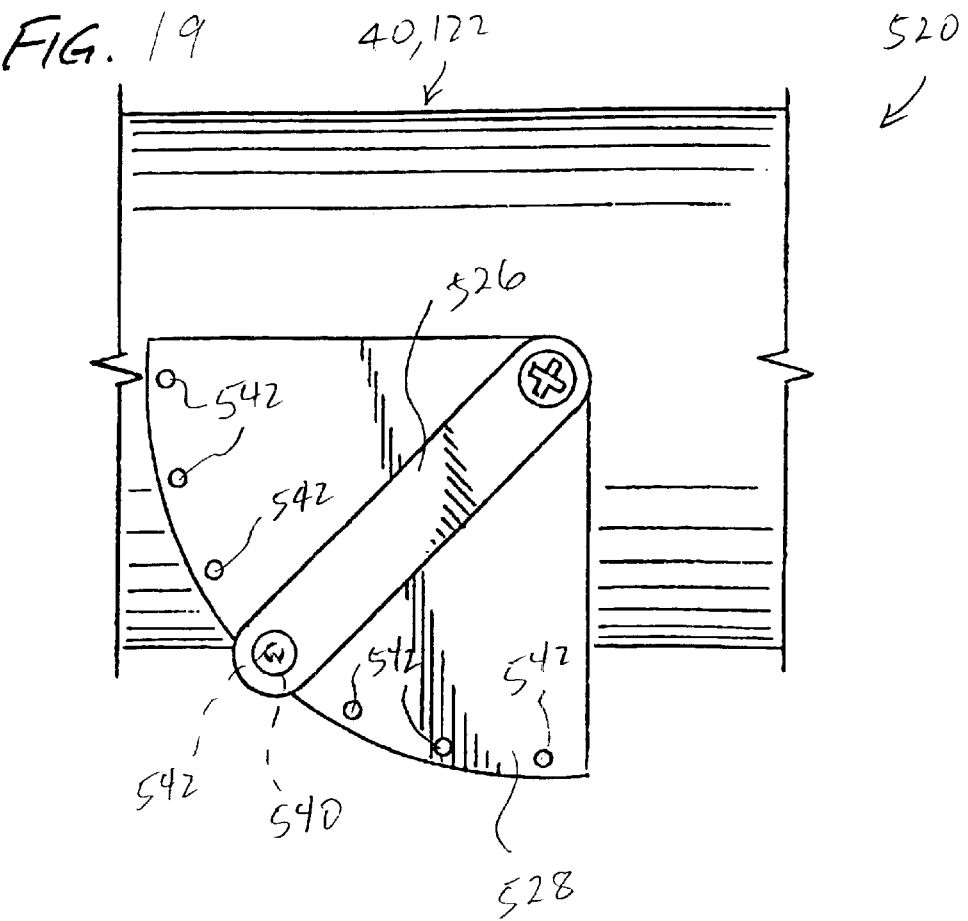

WATER TREATMENT SYSTEMS

RELATED APPLICATIONS

This is a continuation-in-part of application Ser. No. 09/470,577 filed Dec. 12, 1999 now U.S. Pat. No. 6,264,846.

FIELD OF THE INVENTION

The present invention relates to the treatment of water that is discharged into the environment and, more specifically, to the processing of water such as the removal or addition of chlorine and chloramines from or to water discharged from water lines during flushing, initial disinfecting, testing, and the like.

BACKGROUND OF THE INVENTION

Treated water is often discharged from utility water systems during flushing, testing, and the like. Utility water is often treated for human consumption with chemicals such as chlorine.

Traditionally, chlorinated water was simply discharged into the surrounding environment. More recently, it has been recognized that chlorinated water may be disruptive to the ecology of the environment into which it is discharged. Accordingly, attempts have been made to treat the utility water before it is discharged into the environment to prevent ecological disruption.

The present invention relates to systems and methods of treating chlorinated utility water discharged into the surrounding environment such that the water does not disrupt the ecology of the surrounding environment.

SUMMARY OF THE INVENTION

The present invention is a system or method for processing water by adding an additive to a stream of pressurized fluid. The system comprises first and second bodies. The first body defines a main passageway having a main inlet and a main outlet. The stream of pressurized fluid enters the main passageway through the main inlet. The second body is secured to the first body. The second body defines an additive passageway having an additive port. The additive passageway is in fluid communication with the main passageway at an injection location. Fluid flowing through the system creates low pressure that draws the additive through the additive port and the additive passageway and into the stream of pressurized fluid.

BRIEF DESCRIPTION OF THE DRAWING

FIG. 1 is a schematic block diagram depicting the use of a water processing system constructed in accordance with, and embodying, the principles of the present invention;

FIG. 2 is a partial schematic/partial section view of the water processing system of FIG. 1;

FIG. 3 is a partial end elevation view of an orifice restricting structure taken along lines 3—3 in FIG. 2;

FIG. 4 is a top plan view of an exemplary water processing system of the present invention;

FIG. 5 is a side elevation view of the dechlorinization system depicted in FIG. 4;

FIG. 6 is an enlarged section view of an injection chamber that forms a part of the water processing system of FIGS. 4 and 5;

FIGS. 15 and 16 are section views depicting a gauge system, in first and second configurations, that may be used with the present invention;

FIG. 17 is a partial section view depicting the gauge system of FIG. 15 taken along a line perpendicular to the views of FIGS. 15 and 16;

FIG. 18 is a section view depicting a locking valve assembly that may be used with the present invention taken;

FIG. 19 is a front elevation view depicting the locking valve of FIG. 18; and

DETAILED DESCRIPTION OF THE PREFERRED EMBODIMENTS

Figure 7:
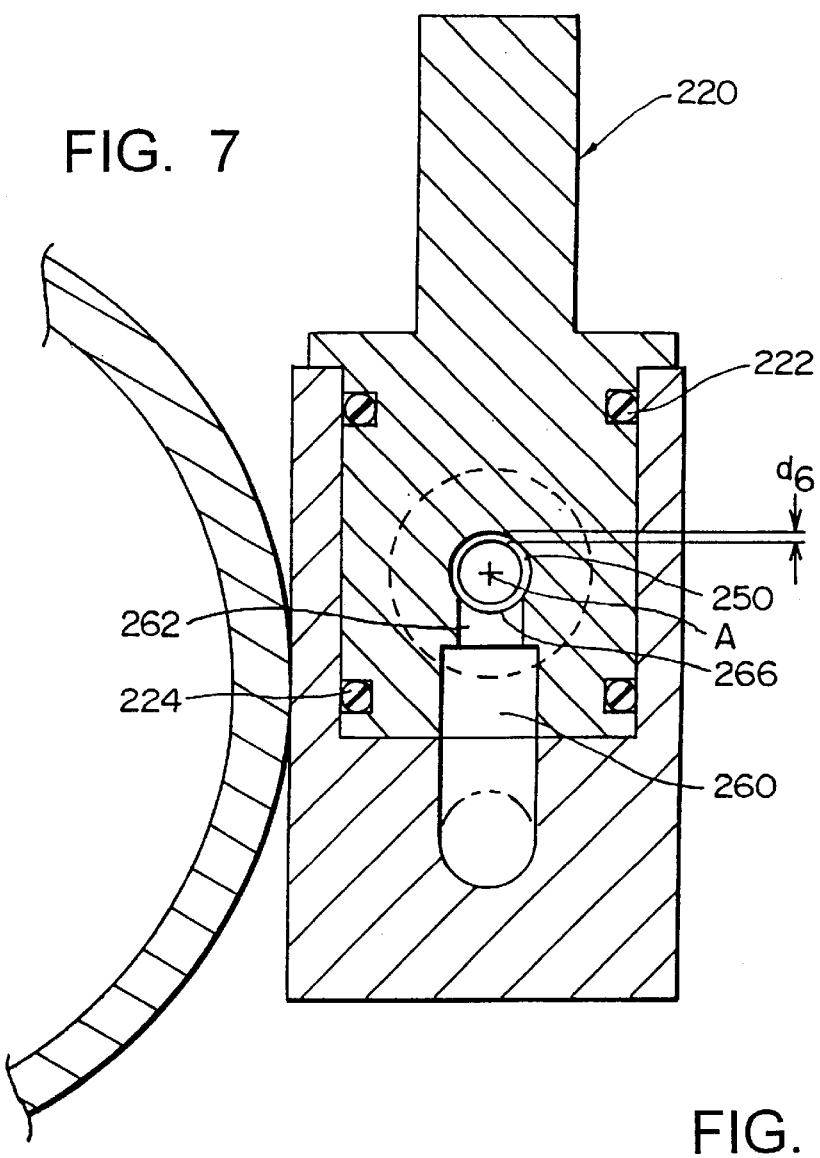
FIG. 7 is a partial section view taken along lines 7—7 of FIG. 6.

Referring initially to FIG. 1, depicted at 20 therein is a water processing system that mixes unprocessed water 22 with additive concentrate 24 to obtain processed water 26 that is discharged into a discharge area 28.

The discharge area 28 typically is not contained and thus any water introduced therein will eventually flow into rivers, streams, or the like and/or will seep into the groundwater.

The unprocessed water 22 is obtained from a water source 30. The water source 30 is typically a utility supply line or the like that contains water that has been treated with chlorine for disinfection and/or human consumption. The characteristics of the water source 30 and the unprocessed water 22 obtained therefrom can vary significantly depending upon the characteristics of the utility system and the location of the connection to the utility system.

The characteristics of the water source 30 and unprocessed water 22 that are most relevant to the preferred embodiment of the water processing system 20 include flow rate and chlorine content.

The additive concentrate 24 is obtained from a reagent supply 32. The concentrate 24 contains a material that, when mixed with unprocessed water 22, reacts with and neutralizes the chlorine. Appropriate reagents for use in the additive concentrate 24 may include one or more of the following: sulfur dioxide, sodium bisulfite, sodium sulfite, sodium thiosulfate, and ascorbic acid.

The reagent supply 32 comprises a container such as a bucket or the like capable of containing the additive concentrate 24. Typically, the additive concentrate 24 is obtained by mixing a dry reagent material with water to obtain a liquid having a known concentration of reagent.

Referring now to FIG. 2, the exemplary water processing system 20 will now be described in further detail. The water processing system 20 comprises a structure 40 defining a main passageway 42, a bypass passageway 44, an injection passageway 46, and a tap passageway 48. In the following discussion, the terms "upstream" and "downstream" are in reference to the direction of fluid flow through a given passageway during normal use. In addition, the terms "inlet" and "outlet" refer to openings in which, under normal use, fluid enters and exits, respectively, a given passageway.

The main passageway 42 defines a main inlet opening 50, a main outlet opening 52, and a mixing portion 54. As shown in FIG. 1, the main inlet opening 50 is operatively connected by an inlet hose 56 to the water source 30, while the main outlet opening 52 is operatively connected to an outlet hose 58 that discharges the processed water 26 into the discharge area 28. Any conventional fitting may be used to connect the main inlet and outlet openings 52 and 54 to the hoses 56 and 58 as appropriate for the source 30 of unprocessed water 22.

Referring again to FIG. 2, the bypass passageway 44 is in fluid communication with the main passageway 42 through a bypass inlet opening 60 and a bypass outlet opening 62. The bypass passageway 44 further comprises an injection portion 64 spaced between the bypass inlet opening 60 and the bypass outlet opening 62 and a premix portion 66 downstream of the injection portion 64.

During normal operation, a portion of any fluid travelling through the main passageway 42 enters the bypass passageway 44 through the bypass inlet opening 60, flows through the injection portion 64 of the bypass passageway 44, and then enters the mixing portion 54 of the main passageway 42 through the bypass outlet opening 62.

FIG. 2 also shows that the injection passageway 46 defines an injection outlet opening 70 and an injection inlet opening 72. The injection passageway 46 is in fluid communication with the injection portion 64 of the bypass passageway 44 through the injection outlet opening 70. The injection inlet opening 72 is operatively connected to the supply 32 of additive concentrate 24 through an injection hose 74. An injection valve assembly 76 is arranged in the bypass passageway 44 to allow the flow of fluid through this passageway 44 to be controlled. As will be described below, the additive concentrate 24 will flow into the injection portion 64 of the bypass passageway 44 under normal operation of the system 20.

The tap passageway 48 is in fluid communication with the bypass passageway 44 through a tap inlet opening 80. A portion of any fluid flowing through the bypass passageway 44 will thus flow through the tap passageway 48 to a tap outlet opening 82. A tap valve assembly 84 allows control of the flow of fluid through the tap passageway 48.

As will be described in detail below, the geometry of the injection portion 64 of the bypass passageway 44 is such that flow of the unprocessed water 22 through the bypass passageway draws the additive concentrate 24 from the reagent supply 32 through the injection hose 74 and injection passageway 46 and into the bypass passageway 44. As the unprocessed water 22 and additive concentrate 24 flow through the premix portion 66 of the bypass passageway 44, the additive concentrate 24 is premixed with the unprocessed water 22 to obtain a reagent dilution 88. The reagent dilution 88 flows into the mixing portion 54 of the main passageway 42. The tap passageway 48 and the tap valve 84 associated therewith are provided primarily to provide a controlled source of water on site that may be used to form the additive concentrate 24.

In the mixing portion 54 of the main passageway 42 (and in the outlet hose 58 downstream thereof), the reagent dilution 88 mixes with the unprocessed water 22 to obtain the processed water 26. If the concentration of reagent in the additive concentrate 24 is appropriate for the flow rate and chlorine concentration of the unprocessed water 22, the processed water 26 may be discharged into the discharge area 28 without harming the ecology of this area 28.

Referring now for a moment back to FIG. 2, shown at 90 therein is a flow restriction system that may be incorporated into the water processing system 20. The exemplary flow restriction system 90 comprises an annular projection 92 that extends into the main passageway 42 and a plurality of restriction discs 94. The annular projection 92 is arranged in the main passageway 42 between the bypass inlet opening 60 and bypass outlet opening 62.

The system 20 may be used without any of the restriction discs 94 or, as shown in FIG. 2, with one of the restriction discs 94 disposed within the main passageway 42. The restriction discs 94 are rigid members having an opening 96 formed therein. The annular projection 92 engages the restriction discs 94 in the main passageway 42 to maintain these discs at a desired location within the main passageway 42 such that fluid flowing through the main passageway 42 must flow through the opening 96 in the disc 94. This desired position is located between the bypass inlet and outlet openings 60 and 62.

When the system 20 is operated without a restriction disc, fluid flows from the main inlet opening 50 to the main outlet opening 52 substantially unhindered. When one of the restriction discs 94 is used, the flow of fluid from the main inlet opening 50 to the main outlet opening 52 is restricted. The restriction discs 94 thus create a differential pressure between an inlet portion 98 of the main passageway 42 upstream of the restriction disc 94 and the mixing portion 54 of the main passageway 42, which is located downstream of the of the restriction disc 94.

Each disc 94 will have an opening 96 of a different cross-sectional area. The smaller the cross-sectional area of the openings 96, the larger the differential pressure between the inlet and mixing portions 98 and 54 of the main passageway 42. In certain situations, a differential pressure as created by the restriction disc 94 may be necessary to control the flow of unprocessed water 22 and thereby ensure a proper proportion of the additive concentrate 24 is mixed with the unprocessed water 22. These discs 94, in conjunction with the bypass passageway 44, allows the system 20 to accommodate a wide range of flow rates of the unprocessed water 22 with minimal head losses through the system 20.

Referring now to FIGS. 4 and 5, depicted therein at 120 is an exemplary processing assembly that may be used as the structure 40 described above.

The processing assembly 120 defines the main, bypass, injection, and tap passageways 42, 44, 46, and 48 as described above. The reference characters used above to identify the features of these passageways 42, 44, 46, and 48 will be used in the discussion of the processing assembly 120 below.

The processing assembly 120 comprises a main body 122, a bypass assembly 124, a handle 126, and an injector plug assembly 128.

The exemplary main body 122 is a hollow member having an inner wall surface 130a and an outer wall surface 130b. The inner wall surface 130b defines the main passageway 42.

Preferably, the main body 122 is a short length of cylindrical pipe having threaded outer wall surface portions 132 and 134 to facilitate connection of the body 122 to the inlet and outlet hoses 56 and 58 through conventional coupling assemblies. Through holes 136 and 138 are formed in the main body 122 to form the bypass inlet and outlet openings 60 and 62, respectively. The restriction projection 92 of the restriction system 90 extends radially inwardly from the inner wall surface 130a between the through holes 136 and 138.

The bypass assembly 124 basically comprises a bypass body 150, the injection and tap valve assemblies 76 and 84 described above, an inlet gauge 152, and, optionally, an outlet gauge 154.

The bypass body 150 is a solid metal piece milled to define the bypass, injection, and tap passageways 44, 46, and 48.

The bypass passageway 44 is partly formed by first and second colinear end bores 160 and 162. These end bores 160 and 162 are formed by drilling in opposite directions into the body 150. The bits used to form these bores 160 and 162 are shaped to obtain frustoconical end walls 164 and 166.

A plug bore 168 is also formed in the bypass body 150; the plug bore 168 intersects the end walls 164 and 166 of the end bores 160 and 162. The injector plug assembly 128 is inserted into the plug bore 168 to define portions of the bypass passageway 44 and the injector passageway 46 as will be described in further detail below.

The injection and tap passageways 46 and 48 are partly formed by a side bore 170 formed in the bypass body 150 parallel to the end bores 160 and 162. The side bore 170 is separated into injection and tap portions 172 and 174 by an intermediate plug 176. Injection and tap cross bores 180 and 182 are formed in the body 150 to intersect with the side bore 170 and complete the injection and tap passageways 46 and 48.

Injection and tap ports 184 and 186 are fitted into the injection and tap cross bores 180 and 182 to define the injection inlet opening 72 and tap outlet opening 82, respectively. The ports 184 and 186 are conventional fittings sized and dimensioned to allow hose such as the injection hose 74 be connected to the injection and tap passageways 46 and 48.

Figure 8:
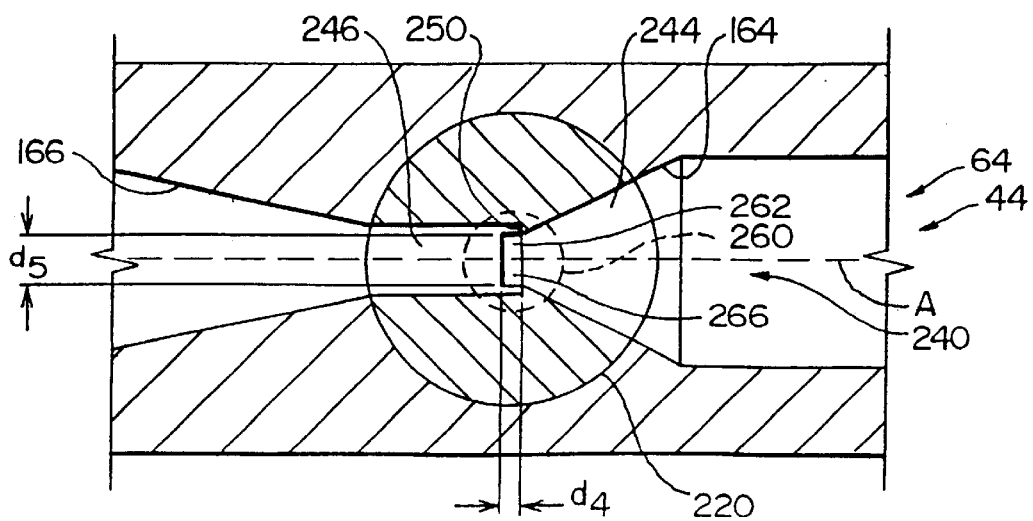
FIG. 8 is a section view taken along lines 8—8 in FIG. 6.

Referring now to FIGS. 6–8, the injection portion 64 of the bypass passageway 44 and injection plug assembly 128 will be described in further detail. Referring initially to FIG. 6, it can be seen that the injection plug assembly 128 comprises a plug body 220 and first and second plug O-rings 222 and 224.

The plug body 220 is generally cylindrical but defines first and second plug ring grooves 226 and 228 and comprises a locking projection 230. A portion of the plug O-rings 222 and 224 resides in the ring grooves 226 and 228. During use, the plug body 220 is snugly received within a plug cavity 232 formed in the bypass body 124. A retaining projection 234 is formed on the bypass body 124. Inserting the plug body 220 into the plug cavity 232 and axially rotating the plug body about its longitudinal axis causes the locking projection 230 to engage the retaining projection 234.

When the plug body 220 is properly oriented relative to the bypass body 124, the retainer projection 234 engages the locking projection 230 to prevent further axial rotation of the plug body 220 or movement of the plug body 220 along its longitudinal axis relative to the bypass body 124. When the plug body 220 is locked in its proper position relative to the bypass body 124, the O-rings 222 and 224 seal the juncture between the plug body 220 and the bypass body 124.

The plug body 128 defines a through passageway 240 and a side passageway 242. When the plug body 220 is locked onto the bypass body 124, the through passageway 240 forms a part of the injection portion 64 of the bypass passageway 44 and the side passageway 242 forms a part of the injection passageway 46.

The through passageway 240 comprises a frustoconical portion 244 and a cylindrical portion 246. The frustoconical and cylindrical portions 244 and 246 meet at a reduced diameter end 248 of the frustoconical portion 244. In addition, the radius of the cylindrical portion 246 is slightly larger than the radius of the frustoconical portion 244 at its reduced diameter end 148 such that an annular lip 250 is formed at the juncture of the frustoconical and cylindrical portions 244 and 246. The lip 250 is generally orthogonal to the direction of the flow of fluid through the injection passageway 46 in the injection portion 64 thereof.

The through passageway 240 further defines a center axis A. The frustoconical and cylindrical portions 244 and 246 of the passageway 240 are aligned along the center axis A, as are the frustoconical end walls 164 and 166 of the bypass body 124 described above. In addition, the end walls 164 and 166 and portions 244 and 246 of the through passageway 240 are sized and dimensioned such that injection portion 64 of the bypass passageway 46 is continuous where the plug body 220 meets the bypass body 124 as shown in FIGS. 6 and 8.

As perhaps best shown in FIG. 8, the side passageway 242 comprises a cylindrical portion 260 and a rectangular portion 262 connected by a generally frustoconical portion 264. The cross-sectional area of the cylindrical portion 260 is larger than that of the rectangular portion 262. The rectangular portion 262 meets with the cylindrical portion 246 of the through passageway 240 to form an elongate, arcuate slit 266 through which the fluid is drawn as it enters the injection portion 64 of the bypass passageway 46.

The slit 266 is arranged to introduce fluid into the injection portion 64 downstream of the annular lip 250. The rectangular portion 262 is arranged such that fluid passing through the injection passageway 46 is enters the bypass passageway 44 at substantially a right angle to the flow of fluid into the bypass passageway 44.

The geometry of the injection portion 64 of the bypass passageway 46 as just described creates a low or vacuum pressure area in the cylindrical portion 246 of the through passageway 240. In particular, the injection portion 64 of the bypass passageway 46 comprises a decreasing cross-sectional area portion, a constant cross-sectional area portion, and an increasing cross-sectional area portion. The low pressure created by this geometry effectively draws the additive concentrate 24 from the supply 32 thereof into the bypass passageway 46. This geometry thus creates, in effect, a venturi eductor. The injection valve assembly 76 controls the amount of the additive concentrate 24 that is drawn into the bypass passageway 46.

The table below sets forth the preferred values of certain parameters, and first and second acceptable ranges of these values, describing the geometry of the injection portion 64 of the bypass passageway 46; these parameters are identified in FIG. 16. All angles are measured with reference to the longitudinal axis A described above:

TABLE A

| Dimension | Preferred Value | First Preferred Range | Second Preferred Range |
|---|---|---|---|
| $a_1$ | 25° | 25° ± 10% | 25° ± 15% |
| $a_2$ | 5° | 5° ± 10% | 5° ± 15% |

TABLE A-continued

| Dimension | Preferred Value | First Preferred Range | Second Preferred Range |
| --- | --- | --- | --- |
| $l_1$ | 2.75" | 2.75" ± 10% | 2.75" ± 15% |
| $l_2$ | 0.36" | 0.36" ± 10% | 0.36" ± 15% |
| $l_3$ | 0.50" | 0.50" ± 10% | 0.50" ± 15% |
| $d_1$ | 0.265" | 0.265" ± 10% | 0.265" ± 15% |
| $d_2$ | 0.750" | 0.750" ± 10% | 0.750" ± 15% |
| $d_3$ | 0.250" | 0.250" ± 10% | 0.250" ± 15% |
| $d_4$ | 0.750" | 0.750" ± 10% | 0.750" ± 15% |
| $t_1$ | 0.0075" | 0.0075" ± 10% | 0.0075" ± 15% |
| $t_2$ | 0.031" | 0.031" ± 10% | 0.031" ± 15% |

The numbers provided above are optimized for a cylindrical main passageway having a diameter of approximately three inches. A main passageway of a different cross-sectional area may be employed, in which case the values of the various parameters described above should be scaled up or down accordingly. The preferred embodiment described herein is thus preferred only in the general proportions or ratios inherent in the geometry described in Table A. In the event that the system 20 described herein is to be scaled up or down, certain ratios should be maintained to provide proper operation of the larger or smaller scale system.

In particular, the ratios of $l_1$ to $l_2$, $l_1$ to $l_3$, and $d_1$ to $d_2$ are preferably approximately the same as those of the preferred embodiment described above. More broadly, the ratios of the values defining a system implementing the principles of the present invention are preferably within a first preferred range of plus or minus ten percent from the ratios inherent in Table A, but in any event should be within a second preferred range of plus or minus twenty percent from the ratios inherent in Table A.

Figure 9:
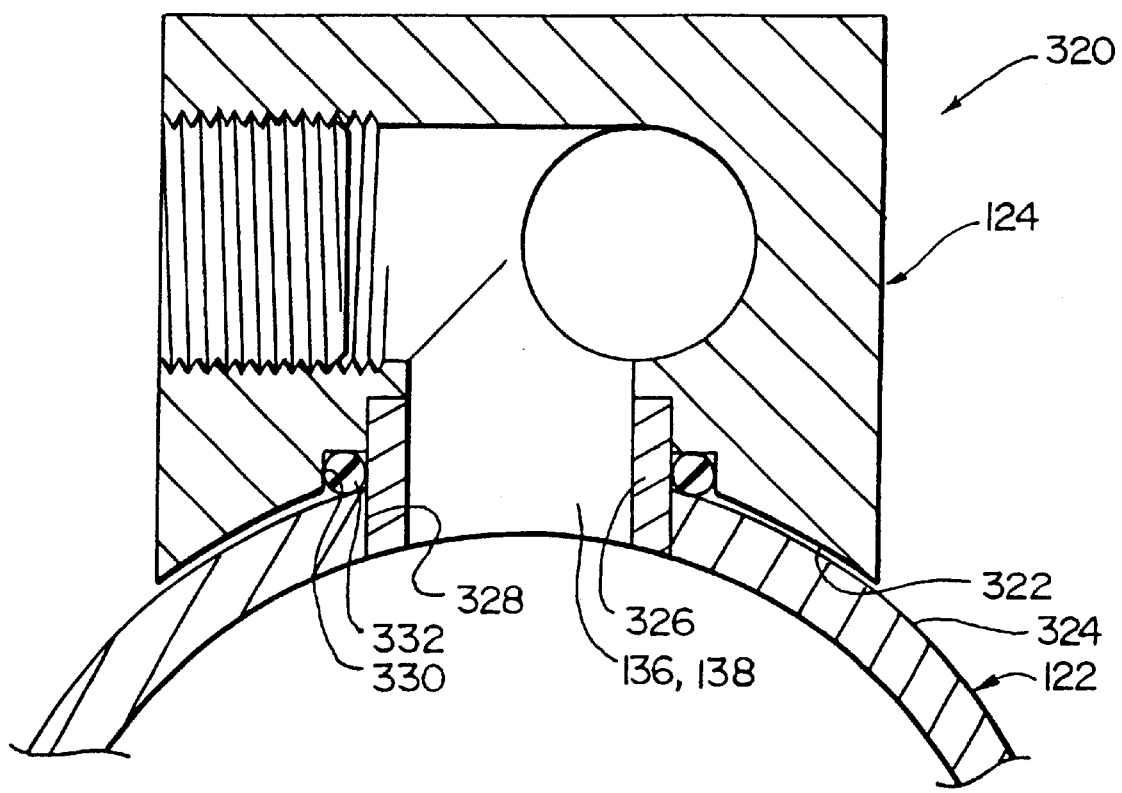
FIG. 9 is an enlarged section view of a system for securely connecting and sealing an injection assembly and a main body of the dechlorinization system of FIGS. 4 and 5.

Referring now to FIG. 9, depicted therein is a sealing system 320 that forms a seal between the main body 122 and the bypass body 124. Two such sealing systems are employed by the system 20, one adjacent to the inlet 60 of the bypass passageway 44 and one adjacent to the outlet 62 of the bypass passageway 44. The two sealing systems used by the system 20 are identical, and the following discussion applies to either of these systems.

As shown in FIG. 9, a lower surface 322 of the bypass body 124 is curved to conform to an outer surface 324 of the generally cylindrical main body 122. Extending from the lower surface 322 of the bypass body 124 is a cylindrical member 326 that is press fit into a bore 328 in the bypass body 124. An annular seal groove 330 is formed in the bypass body 124 around the bore 328. An O-ring 332 is placed into the seal groove 330.

When the bypass body 124 is mounted on the main body 122, the cylindrical member 326 extends into the through holes 136,138 in the main body 122. The O-ring 332 is snugly held between the main body 122 and the bypass body 124 to form a seal around the through holes 136,138.

Referring for a moment to FIGS. 4 and 5, it can be seen that six fasteners 334 are employed to fasten the bypass body 124 onto the main body 122. These fasteners 334 ensure that the O-ring 332 forms an appropriate seal between the main body 122 and the bypass body 124.

Turning now to FIGS. 10–13, depicted therein are alternate flow restricting systems 90a, 90b, 90c, and 90d that may be used in place of the exemplary flow restricting system 90 described above. All of these systems allow the flow of fluid through the main passageway 42 to be controlled to establish a desired differential pressure between the mixing and the inlet portions 54 and 98 of the main passageway 42.

Figure 10:
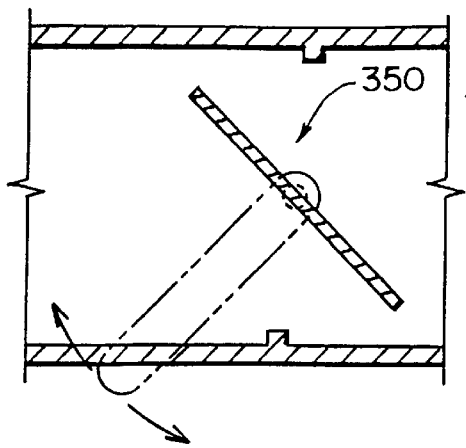
FIGS. 10–13 depict alternate orifice restricting structures that may be substituted for the orifice restricting structure depicted in FIGS. 2–4.
Figure 11:
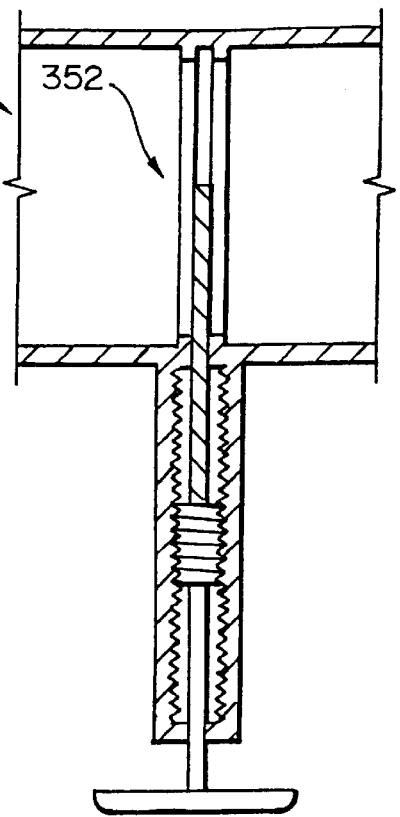
Figure 12:
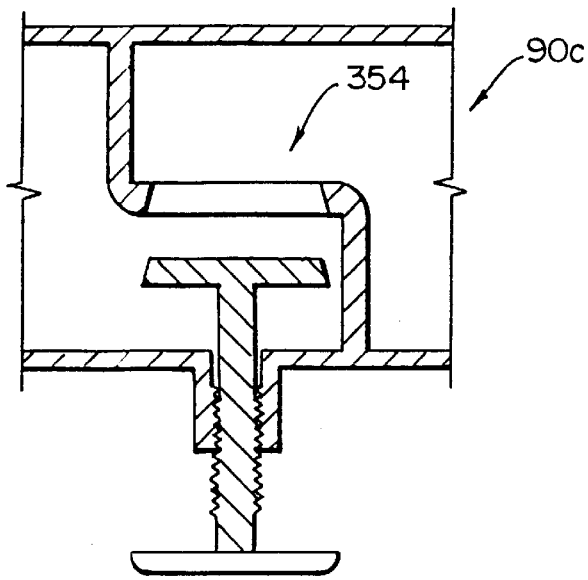
Figure 13:
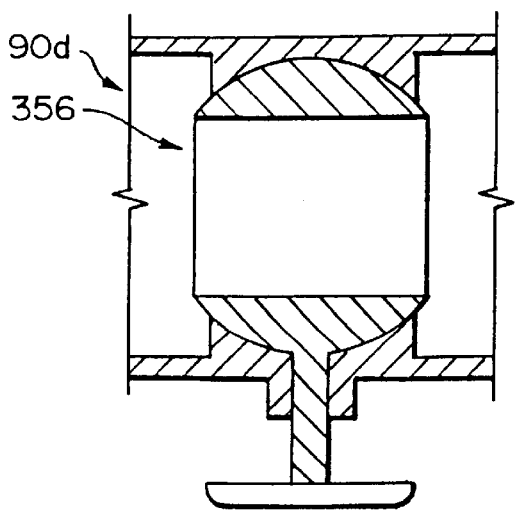
Figure 14:
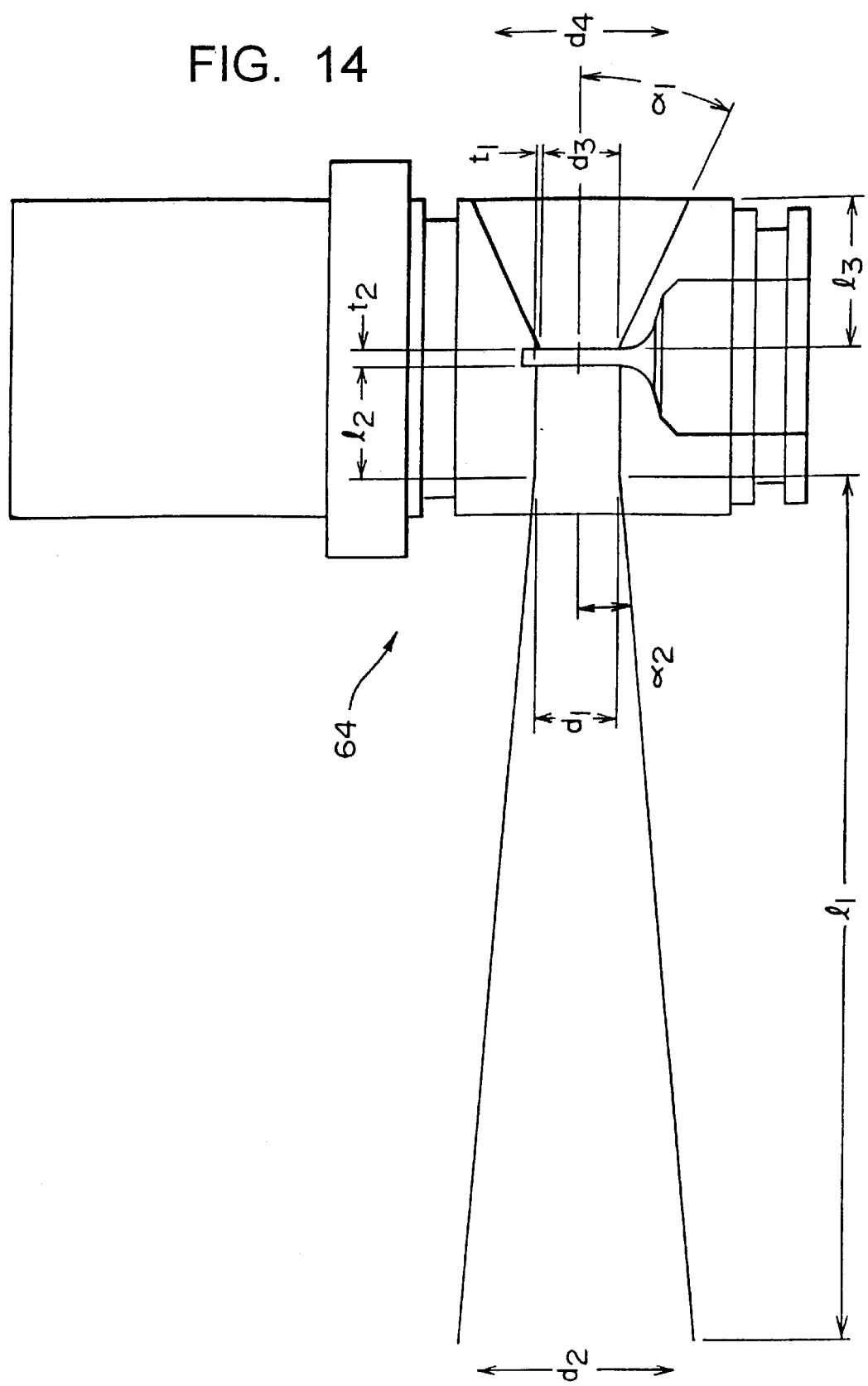
FIG. 14 is a highly schematic diagram depicting certain parameters describing the geometry of an injection portion of the bypass passageway of the system of FIG. 1.

The system 90a in FIG. 10 employs a butterfly valve assembly 350. The system 90b in FIG. 11 employs a gate valve assembly 352. The system 90c in FIG. 12 employs a universe valve assembly 354. The system 90d in FIG. 13 employs a ball valve assembly 356. These valve assemblies 350–356 are conventional and all work by rotating, sliding, or displacing a member relative to an opening to change an effective cross-sectional area of the main passageway 42. By reducing the effective cross-sectional area of the main passageway 42, the flow of fluid through the main passageway 42 is restricted. Flow restricting systems other than the systems 90, 90a, 90b, 90c, and 90d may be used to restrict flow through the main passageway 42.

In the preferred embodiment, a cylindrical injection plug assembly 128 was detachably attached to the bypass body 150. A cylindrical injection plug assembly as described above simplifies certain manufacturing aspects of the exemplary system 20, but other configurations are possible. For example, a block in a shape other than cylindrical, such as a rectangular solid, may be used instead, with the entire injection portion 64 of the bypass passageway 44 being defined by this block. Both such a removable block or the exemplary cylindrical body 150 described above may be removed to allow debris that may flow into and lodge in the constricted injection portion 64 of the bypass passageway 44 to be easily removed.

Figure 15:
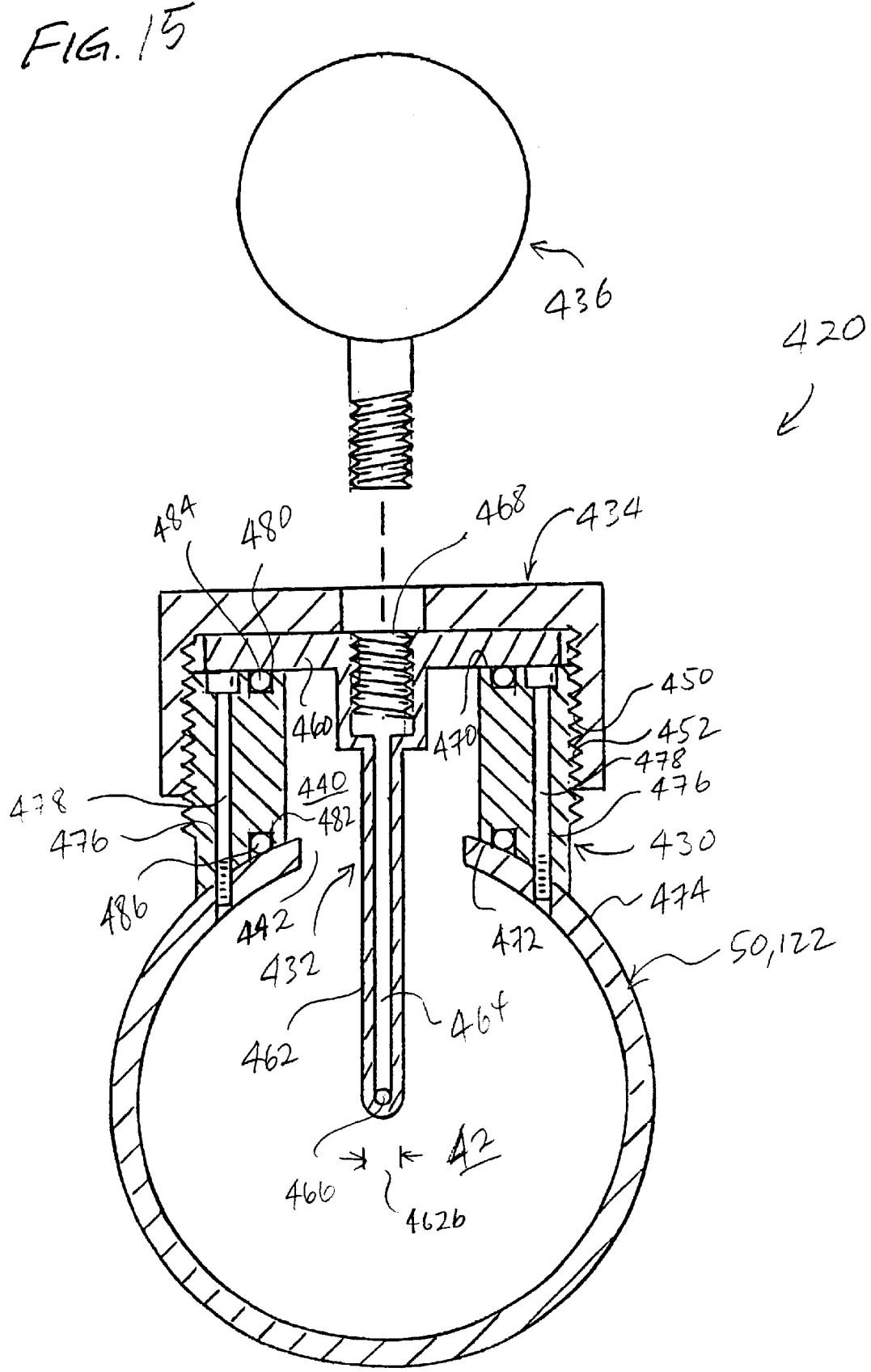

Referring now to FIGS. 15–17, depicted at 420 therein is a gauge system that may optionally be used in conjunction with the processing system of the present invention. The gauge system 420 operates in a first configuration depicted in FIGS. 15 and 17 and a second configuration depicted in FIG. 16.

As shown in FIGS. 15 and 16, the gauge system 420 is adapted to mount on the main structure 40 or main body 122 described above. In FIG. 17, the gauge system 420 is shown mounted on the main body 122. As exemplified by the assembly shown in FIG. 17, the gauge system 420 is mounted upstream of the inlet 60 of the bypass passageway 44. The purpose of the gauge system 420 is to obtain an accurate reading of the upstream pressure of the fluid flowing into the main passageway 42.

The exemplary gauge system 420 comprises a mounting member 430, a sampling member 432, a retaining member 434, a gauge assembly 436, and a blocking plate 438.

The mounting member 430 defines an access passageway 440. An access opening 442 is formed in the main structure 40 or main body 122, and the mounting portion 430 surrounds the opening 442 such that the access passageway 440 is in fluid communication with the access opening 442. The mounting portion 430 defines an external threaded surface 450, and the retaining member 434 defines an internal threaded surface 452 adapted to mate with the external threaded surface 450.

The sampling member 432 comprises a plate portion 460 and a sampling portion 462. The sampling member 432 further defines a sampling passageway 464. The sampling passageway 464 defines a sampling inlet 466 and a sampling outlet 468. The geometry of the sampling portion 460 and sampling passageway 464 are conventional. The sampling portion 460 is designed to bear the loads created by fluid pressure while minimally affecting fluid flow. The sampling passageway 464 forms what is conventionally referred to as a pitot tube, the principles of operation of which are well known. The sampling member 432 will thus be described herein only to the extent necessary for a complete understanding of the present invention.

In the first configuration of the gauge system 420 (FIG. 15), the sampling member 432 is arranged with the plate portion 460 supported by the mounting member 430 and with the sampling portion 462 at least partly inside the main passageway 42. The retaining member 434 is threaded onto the mounting member 430 such that the plate portion 460 is snugly held against the mounting member 430. The dimensions of the sampling portion 462 are such that the sampling inlet 466 is arranged away from the boundaries of the main passageway 42 and is preferably arranged substantially in the center of the main passageway as shown in FIG. 15. The gauge assembly 436 is then attached to the sampling member 432 such that the gauge assembly 436 is in fluid communication with the sampling passageway 464 through the sampling outlet 468.

In this first configuration, fluid flows into the sampling inlet 466, through the sampling passageway 464, and out of the sampling outlet 468. The gauge assembly 436 may thus be used in a conventional manner to determine the fluid pressure within the main passageway 42 at the sampling inlet 466.

In the second configuration (FIG. 16), the retaining member 434 holds the blocking plate 438 securely against the mounting member 430. The blocking plate 438 prevents fluid from flowing out of the main passageway 42 through the access opening 442 and the access passageway 440.

The gauge system 420 will normally be operated in the second configuration, thereby allowing the processing system to operate as described above. Knowledge of the fluid pressure upstream of the processing system will enable the operator to control the injection of additive to obtain a desired affect as described above in detail. Another use of the gauge assembly 436 is to measure fluid flow rate and pressure at a particular point in a water system; for example, these parameters can be measured while dechlorinating water flushed from a fire hydrant.

The gauge assembly 436 is symbolically represented by a mechanical needle gauge, but other gauge assemblies may be used. For example, alternative gauge assemblies are gauges having a digital read out and sensor gauges adapted to generate an electrical pressure signal that may be monitored, processed by a control system, and/or recorded by a memory device for subsequent analysis or processing. Commonly, the pressure signal will be sent to a computer for control, analysis, and/or recording.

Referring for a moment back to FIGS. 15–17, the exemplary gauge system 420 will now be described in further detail. The mounting member 430 is a substantially cylindrical member defining an upper edge 470 and a lower edge 472. The upper edge 470 is cut along a plane substantially perpendicular to the axis of the cylindrical member. The lower edge 472 is cut along a curve defined by the curve of an outer surface 474 of the main structure 40 or main body 122.

Any securing means, such as adhesives, welding, or the like may be used to secure the mounting member to the main structure or body. In the exemplary system 420, first and second fastener holes 476 are formed in the mounting member 430, and fasteners 478 extend through the fastener holes to secure the mounting member 430 onto the main structure 40 or main body 122.

The use of fasteners 478 requires that seals be formed between the mounting member and the main structure or body. The exemplary embodiment described herein thus employs first and second O-ring grooves 480 and 482 formed in the upper and lower edges 470 and 472, respectively, of the mounting member 430. First and second O-rings 484 and 486 are partly received by the grooves 480 and 482, respectively.

When the retaining member 434 holds either the plate portion 460 of the sampling member 432 or the blocking plate 438 against the upper edge 470, the O-ring 480 in the groove 480 compresses to form a fluid-tight seal between the upper edge 470 and the plate portion 460 or plate member 438. Similarly, when the fasteners 478 secure the mounting member 430 onto the main structure or body, the O-ring 486 in the groove 482 compresses to form a fluid-tight juncture between the lower edge 472 and the outer surface 474.

Referring now to FIG. 17, shown at 490 therein is an alignment hole formed in the mounting member 430. The alignment hole 490 is located to receive an alignment pin 492 extending from the plate portion 460 of the sampling member 432 when the sampling portion 462 is properly aligned within the main passageway 42. Other keying systems may be used. One such keying system would be to switch the relative locations of the hole 490 and pin 492. Another would be to form a projection on one of the mounting member 430 or the sampling member 432 and a corresponding recess in the other of the mounting member 430 or sampling member 432.

When the sampling portion 462 is properly aligned within the main passageway, the sampling inlet 466 faces the fluid flowing into the main passageway 42, a large dimension 462a of the sampling portion 462 is substantially parallel to the flow of fluid (FIG. 17) and a small dimension 462b thereof is substantially perpendicular to the flow of fluid (FIG. 15).

In the exemplary gauge system 420, an internal threaded surface 494 is formed in the sampling member 432 at the sampling outlet 468; the gauge assembly 436 defines a matching external threaded surface 496. The gauge assembly 436 is thus threaded onto the sampling member 432 to form a fluid-tight seal.

Figure 20:
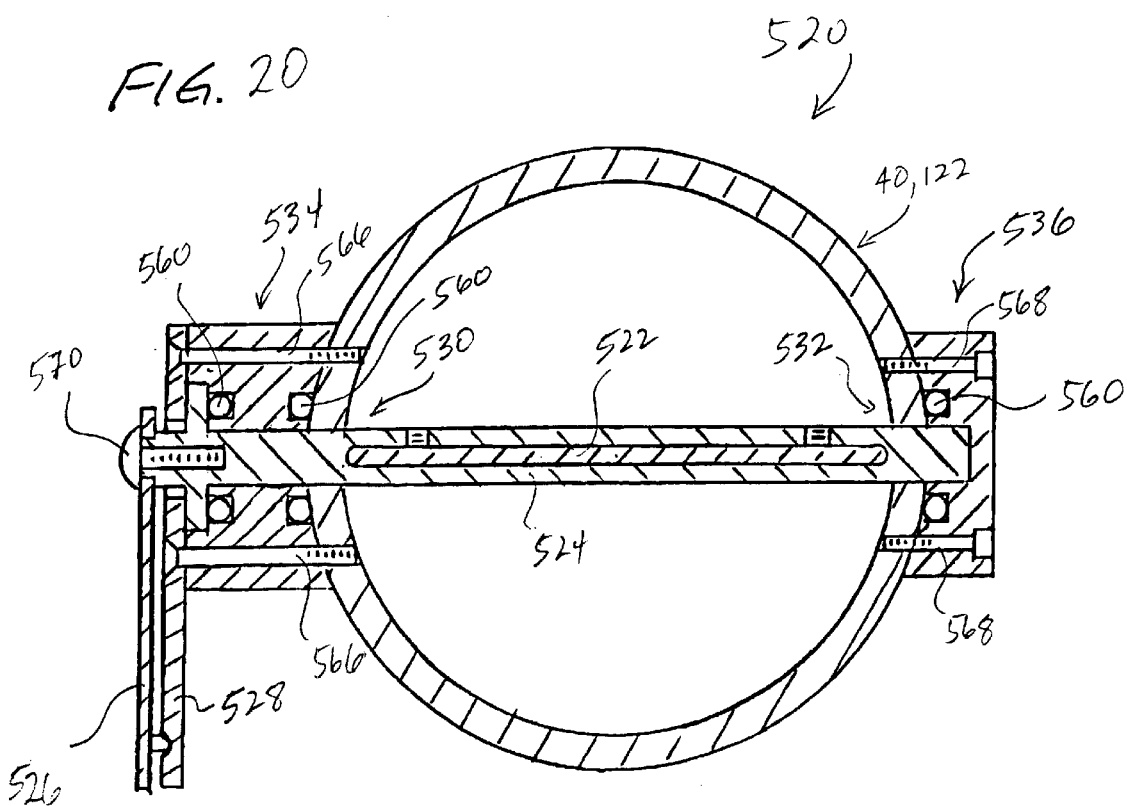
FIG. 20 is a section view depicting the locking valve assembly of FIG. 18 taken along a line perpendicular to the view of FIG. 18.

Referring now to FIGS. 18–20, depicted at 520 therein is a locking valve system that may also optionally be used with the processing system of the present invention. As described above with reference to FIG. 10, a butterfly or plate valve assembly 350 may be used to restrict the flow of fluid through the main passageway 42. The valve system 520 is similar to the valve assembly 350 but is designed to allow the valve assembly to be locked in any one of a range of positions.

As shown in FIG. 20, the exemplary valve system 520 comprises a valve plate 522, a valve shaft 524, a valve handle 526, and a locking plate 528.

The valve plate 522 is secured to the valve shaft 524. The valve shaft 524 extends through first and second mounting holes 530 and 532 formed in the structure 40 or body 122. First and second sealed bearing assemblies 534 and 536 support the valve shaft 524 such that the valve plate 522 is supported within the main passageway 42 and axial rotation of the shaft 524 causes the valve plate to rotate between fully open (522a) and closed (522b) positions as shown in FIG. 18.

The valve handle 526 is rigidly connected to the end of the valve shaft 524 adjacent to the first bearing assembly 534. Rotating the valve handle 526 through a ninety degree arc thus rotates the valve shaft 524, which in turn moves the valve plate 522 between its fully open and closed positions. The locking plate 528 is secured relative to the structure 40 or body 122. The locking plate is arranged relative to the valve handle 526 such that the handle 526 is adjacent to the locking plate 528 as the handle 526 opens and closes the valve plate 522.

The exemplary valve system 520 comprises positive locking system 540 comprising a detent projection 542 extending from the valve handle 526 and a plurality of locking recesses 544 formed in the locking plate 528. The locking recesses 544 are formed in an arc defined by the arc through which the detent projection 542 rotates. As the valve handle 526 moves through its range of movement, the handle 526 deforms slightly to allow the detent projection 542 to move into and out of the locking recesses 544. The engagement of the detent projection 542 and the locking recesses 544 holds the valve shaft 524 in a given angular location, and thus the valve plate 522 in a predetermined position between the fully open and closed positions, inclusive.

The positive locking system 540 described above is desirable because of its simplicity, but other systems may be appropriate in other embodiments of the invention. For example, the detent projection 542 may be formed by a ball, with a spring arranged to force the ball against the locking plate 528. In this case, the handle 526 need not be deformable. Another example would be to form a single hole in the valve handle 526 and a plurality of holes in the locking plate 528; a pin would be inserted through the hole in the handle and one of the holes in the locking plate to fix the handle relative to the plate.

FIG. 20 shows that the bearing assemblies 534 and 536 each comprise one or more O-rings 560 to prevent fluid from exiting the main passageway 42 through the mounting holes 530 or 532. The bearing assemblies comprise main bodies 562 and 564 that hold the O-rings 560 in place and define bearing surfaces that support the valve shaft 524. The placement of the O-rings is routine and is not considered part of the present invention. Fasteners 566 and 568 extend through the main bodies 562 and 564 to secure the bearing assemblies 534 and 536 to the structure 40 or body 122, but other fastening systems such as welding or adhesives may be used. The fasteners 566 further secure the locking plate 528 relative to the structure 40 or body 122. Another fastener 570 secures the valve handle 526 to the valve shaft 524.

The restriction assemblies 90, 90a, 90b, 90c, 90d, and 520 described herein are designed to create sufficient backpressure to ensure that enough fluid flows through the bypass passageway 44 to cause the water processing systems 20 or 120 to operate as described above under all normal operating condition.

For example, in the locking valve assembly 520, first and second valve stops 550 and 552 are formed projection from the structure 40 or body 122 into the main passageway 42 as shown in FIG. 18. These stops 550 and 552 are semi-circular projections extending 180° into the main passageway 42 upstream and downstream, respectively, of the axis of the valve shaft 424. As shown, the valve plate 522 engages these stops 550 and 552 when in its closed position.

The valve stops 550 and 552, valve plate 522, and valve shaft 524 thus define the effective cross-sectional area of the valve opening. Clearly, the valve plate 522 has the greatest effect on the cross-sectional area of the valve opening when not in its fully open position. However, when the valve plate 522 is in its fully open position as shown in FIG. 20, valve shaft 524 and valve stops 550 and 552 defining a maximum cross-sectional area of the valve opening. The maximum cross-sectional area of the maximum opening is predetermined to create sufficient backpressure under a predetermined range of flow rates to cause enough of the fluid passing into the main passageway 42 to enter the bypass passageway 44 to allow the water processing system to operate correctly within the predetermined range of flow rates.

Figures 21A, 21B:
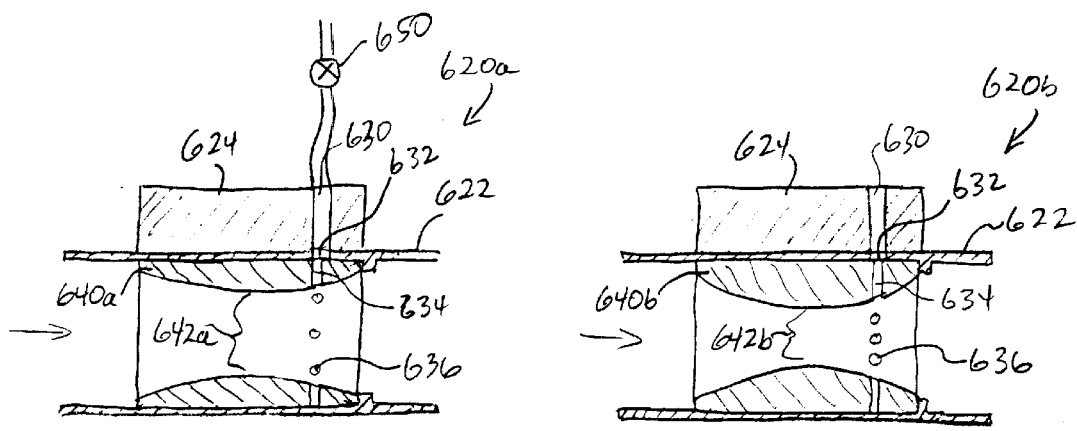
FIGS. 21A–C are section views of another embodiment of a water treatment system constructed in accordance with, and embodying, the principles of the present invention.
Figure 21C:
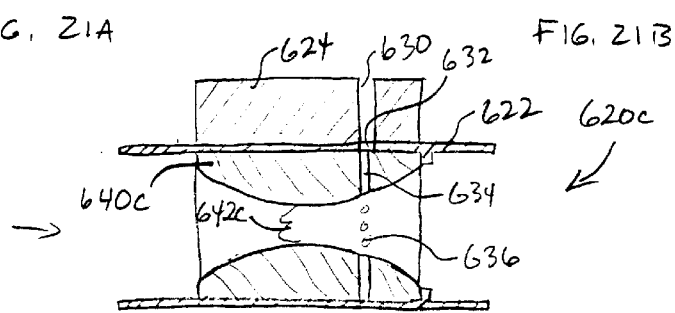

Referring now to FIGS. 21A–C, depicted at 620 therein is yet another water treatment system of the present invention. The exemplary water treatment system 620 exists in three states as shown in FIGS. 21A, 21B, and 21C, respectively. These three states allow the system 620 to handle three different ranges of flow rates.

The system 620 comprises a main housing 622, a secondary housing 624, and first, second, and third insert members 626a, 626b, and 626c. A retaining ring 628 is formed within the main housing 622. A selected one of the three insert members 626a–c is inserted into the main housing 622 such that fluid flow (shown by an arrow) forces the selected insert member 626 against the retaining ring.

An additive port 630 is formed in the secondary housing 624, an additive opening 632 is formed in the main housing 622, and additive plenum chambers 634a–c and injection openings 636a–c are formed in each of the insert members 626a–c. An additive passageway 638 is formed by the port 630, opening 632, chambers 634, and openings 636.

The insert members 626a–c each comprise an inner surface 640a–c past which fluid flowing through the main passageway 42 flows. Each of these surfaces 640a–c has a different contour and defines a narrowest portion forming a restriction or throat 642a–c having a different cross-sectional area. The injection openings 636a–c are spaced downstream of the throats 642a–c. Using the Venturi effect, the throat 642 creates a low pressure area that draws additive through the additive passageway 638 and into the main passageway 42.

The user thus selects one of the insert members 626 based on the flow rate of the pressurized fluid. Medium to high pressures would require the use of the first insert 326a, medium pressures would require the use of the second insert 626b, while medium to low pressures would use the third insert 626c.

From the foregoing, it should be clear that the present invention may be embodied in forms other than those described above.

I claim:

1. A water processing system for dechlorinating a stream of pressurized water comprising:
   a first body defining a main passageway having a main inlet and a main outlet, where the stream of pressurized water enters the main passageway through the main inlet;
   a second body secured to the first body, where the second body defines an additive passageway having an additive port and the additive passageway is in fluid communication with the main passageway at an injection location; and
   a supply of a dechlorination agent in fluid communication with the additive port; wherein
   at least a portion of the water flowing through the system passes through a venturi that creates low pressure which draws the dechlorination agent through the additive port and the additive passageway and into the stream of pressurized water to dechlorinate the stream of pressurized water.

2. A water processing system as recited in claim 1, further comprising a gauge assembly having a sampling portion, where the gauge assembly is selectively secured relative to the main body such that the sampling portion extends into the main passageway upstream of the injection location.

3. A water processing system as recited in claim 2, in which the gauge assembly comprises a sampling member and a blocking plate, where the gauge assembly operates in a first mode in which the sampling member is secured relative to the main body and in a second mode in which the blocking plate is secured relative to the main body.

4. A water processing system as recited in claim 1, further comprising a restriction member arranged in the main passageway upstream of the injection location.

5. A water processing system as recited in claim 4, in which the restriction member comprises a valve plate mounted on a valve shaft such that axial rotation of the valve shaft causes the valve plate to move between fully opened and closed positions.

6. A water processing system as recited in claim 5, further comprising a positive locking system for selectively fixing an angular orientation of the valve shaft to maintain the valve plate in a desired position between the fully opened and closed positions, inclusive.

7. A water processing system as recited in claim 1, further comprising:
    a plurality of insert members having an inner surface defining a throat and an injection opening formed downstream of the throat, where the injection opening is in fluid communication with the additive passageway and defines the injection location; wherein
    one of the plurality of insert members is selected based on an expected flow rate of fluid through the main passageway; and the low pressure created by the throat draws additive through the additive passageway.

8. A method of adding a dechlorination agent to a stream of pressurized water comprising the steps of:
    providing a first body defining a main passageway having a main inlet and a main outlet;
    providing a second body defining an additive passageway having an additive port;
    securing the second body to the first body such that the additive passageway is in fluid communication with the main passageway at an injection location;
    connecting a supply of the dechlorination agent to the additive port;
    causing the stream of pressurized water to enter the main passageway through the main inlet to create a low pressure region that draws the dechlorination agent through the additive port and the additive passageway and into the stream of pressurized fluid.

9. A method as recited in claim 8, further comprising the steps of:
    providing a gauge assembly having a sampling portion;
    selectively securing the gauge assembly relative to the main body such that the sampling portion extends into the main passageway upstream of the injection location.

10. A method as recited in claim 9, in which the step of providing the gauge assembly comprises the steps of providing a sampling member and a blocking plate, the method further comprising the steps of:
    operating the gauge assembly in a first mode in which the sampling member is secured relative to the main body; and
    operating the gauge assembly in a second mode in which the blocking plate is secured relative to the main body.

11. A method as recited in claim 8, further comprising the step of arranging a restriction member in the main passageway upstream of the injection location.

12. A method as recited in claim 11, in which the step of arranging the restriction member in the main passageway comprises the steps of:
    mounting a valve plate mounted on a valve shaft; and
    securing the valve shaft relative to the main body such that axial rotation of the valve shaft causes the valve plate to move between fully opened and closed positions.

13. A method as recited in claim 12, further comprising the step of selectively fixing an angular orientation of the valve shaft to maintain the valve plate in a desired position between the fully opened and closed positions, inclusive.

14. A water processing system for adding a dechlorination agent to a stream of pressurized water comprising:
    a first body defining a main passageway having a main inlet and a main outlet, where the stream of pressurized water enters the main passageway through the main inlet;
    a second body secured to the first body, where the second body defines
    a bypass passageway having an injection portion, where the bypass passageway is connected at first and second locations to the main passageway, and
    an additive passageway having an additive port, where
    the second body is secured to the first body such that the additive passageway is in fluid communication with the main passageway through the bypass passageway;
    a supply of the dechlorination agent in fluid communication with the additive port; and
    a restriction member arranged in the main passageway between the first and second locations to cause at least a portion of the stream of pressurized water to flow through the bypass passageway; wherein
    the water flowing through the injection portion of the bypass passageway creates low pressure that draws the dechlorination agent through the additive port, the additive passageway, the bypass passageway, and into the stream of pressurized water in the main passageway.

15. A water processing system as recited in claim 14, further comprising a gauge assembly having a sampling portion, where the gauge assembly is selectively secured relative to the main body such that the sampling portion extends into the main passageway upstream of the first and second locations.

16. A water processing system as recited in claim 15, in which the gauge assembly comprises a sampling member and a blocking plate, where the gauge assembly operates in a first mode in which the sampling member is secured relative to the main body and in a second mode in which the blocking plate is secured relative to the main body.

17. A water processing system as recited in claim 14, in which the restriction member comprises a valve plate mounted on a valve shaft such that axial rotation of the valve shaft causes the valve plate to move between fully opened and closed positions.

18. A water processing system as recited in claim 17, further comprising a positive locking system for selectively fixing an angular orientation of the valve shaft to maintain the valve plate in a desired position between the fully opened and closed positions, inclusive.

19. A water processing system for adding an additive to a stream of pressurized fluid comprising:
    a first body defining a main passageway having a main inlet and a main outlet, where the stream of pressurized fluid enters the main passageway through the main inlet;

a second body secured to the first body, where the second body defines an additive passageway having an additive port and the additive passageway is in fluid communication with the main passageway at an injection location; and a gauge assembly having a sampling portion, where the gauge assembly is selectively secured relative to the main body such that the sampling portion extends into the main passageway upstream of the injection location; wherein at least a portion of the fluid flowing through the system passes through a venturi that creates low pressure which draws the additive through the additive port and the additive passageway and into the stream of pressurized fluid.

20. A water processing system as recited in claim 19, in which the gauge assembly comprises a sampling member and a blocking plate, where the gauge assembly operates in a first mode in which the sampling member is secured relative to the main body and in a second mode in which the blocking plate is secured relative to the main body.

21. A water processing system as recited in claim 19, further comprising a restriction member arranged in the main passageway upstream of the injection location.

22. A water processing system as recited in claim 21, in which the restriction member comprises a valve plate mounted on a valve shaft such that axial rotation of the valve shaft causes the valve plate to move between fully opened and closed positions.

23. A water processing system as recited in claim 22, further comprising a positive locking system for selectively fixing an angular orientation of the valve shaft to maintain the valve plate in a desired position between the fully opened and closed positions, inclusive.

24. A method of adding an additive to a stream of pressurized fluid comprising the steps of:

providing a first body defining a main passageway having a main inlet and a main outlet;

providing a second body defining an additive passageway having an additive port;

securing the second body to the first body such that the additive passageway is in fluid communication with the main passageway at an injection location;

causing the stream of pressurized fluid to enter the main passageway through the main inlet;

creating a low pressure region that draws the additive through the additive port and the additive passageway and into the stream of pressurized fluid;

providing a gauge assembly having a sampling portion; and selectively securing the gauge assembly relative to the main body such that the sampling portion extends into the main passageway upstream of the injection location.

25. A method as recited in claim 24, in which the step of providing the gauge assembly comprises the steps of providing a sampling member and a blocking plate, the method further comprising the steps of:

operating the gauge assembly in a first mode in which the sampling member is secured relative to the main body; and operating the gauge assembly in a second mode in which the blocking plate is secured relative to the main body.

26. A method as recited in claim 24, further comprising the step of arranging a restriction member in the main passageway upstream of the injection location.

27. A method as recited in claim 26, in which the step of arranging the restriction member in the main passageway comprises the steps of:

mounting a valve plate mounted on a valve shaft; and securing the valve shaft relative to the main body such that axial rotation of the valve shaft causes the valve plate to move between fully opened and closed positions.

28. A method as recited in claim 27, further comprising the step of selectively fixing an angular orientation of the valve shaft to maintain the valve plate in a desired position between the fully opened and closed positions, inclusive.

29. A water processing system for adding an additive to a stream of pressurized fluid comprising:

a first body defining a main passageway having a main inlet and a main outlet, where the stream of pressurized fluid enters the main passageway through the main inlet;

a second body secured to the first body, where the second body defines a bypass passageway having an injection portion, where the bypass passageway is connected at first and second locations to the main passageway, and an additive passageway having an additive port, where the second body is secured to the first body such that the additive passageway is in fluid communication with the main passageway through the bypass passageway;

a restriction member arranged in the main passageway between the first and second locations to cause at least a portion of the stream of pressurized fluid to flow through the bypass passageway; and a gauge assembly having a sampling portion, where the gauge assembly is selectively secured relative to the main body such that the sampling portion extends into the main passageway upstream of the first and second locations; wherein the fluid flowing through the injection portion of the bypass passageway creates low pressure that draws the additive through the additive port, the additive passageway, the bypass passageway, and into the stream of pressurized fluid in the main passageway.

30. A water processing system as recited in claim 29, in which the gauge assembly comprises a sampling member and a blocking plate, where the gauge assembly operates in a first mode in which the sampling member is secured relative to the main body and in a second mode in which the blocking plate is secured relative to the main body.

31. A water processing system as recited in claim 29, in which the restriction member comprises a valve plate mounted on a valve shaft such that axial rotation of the valve shaft causes the valve plate to move between fully opened and closed positions.

32. A water processing system as recited in claim 31, further comprising a positive locking system for selectively fixing an angular orientation of the valve shaft to maintain the valve plate in a desired position between the fully opened and closed positions, inclusive.

33. A water processing system for adding an additive to a stream of pressurized fluid comprising:

a first body defining a main passageway having a main inlet and a main outlet, where the stream of pressurized fluid enters the main passageway through the main inlet;

a second body secured to the first body, where the second body defines an additive passageway having an additive port and the additive passageway is in fluid communication with the main passageway at an injection location a plurality of insert members having an inner surface defining a throat and an injection opening formed downstream of the throat, where the injection opening is in fluid communication with the additive passageway and defines the injection location; wherein one of the plurality of insert members is selected based on an expected flow rate of fluid through the main passageway;

the low pressure created by the throat draws additive through the additive passageway; and at least a portion of the fluid flowing through the system passes through a venturi that creates low pressure which draws the additive through the additive port and the additive passageway and into the stream of pressurized fluid.

* * * * *